United States Patent
Grzybowski et al.

(10) Patent No.: US 7,133,952 B2
(45) Date of Patent: Nov. 7, 2006

(54) METHOD AND APPARATUS FOR A WEARABLE COMPUTER

(76) Inventors: Peter W. Grzybowski, 5448 E. St. John Rd., Scottsdale, AZ (US) 85254; Charlene J. Todd, 2833 W. Ivanhoe St., Chandler, AZ (US) 85224; Russell W. Adams, 644 S. Balboa, Mesa, AZ (US) 85206

(*) Notice: Subject to any disclaimer, the term of this patent is extended or adjusted under 35 U.S.C. 154(b) by 174 days.

(21) Appl. No.: 10/178,158

(22) Filed: Jun. 24, 2002

(65) Prior Publication Data

US 2004/0267997 A1 Dec. 30, 2004

Related U.S. Application Data

(62) Division of application No. 09/390,785, filed on Sep. 7, 1999, now Pat. No. 6,725,282.

(51) Int. Cl.
*G06F 13/24* (2006.01)

(52) U.S. Cl. ........................................ 710/260; 710/268
(58) Field of Classification Search ................. 710/260, 710/268, 261, 305, 309, 1
See application file for complete search history.

(56) References Cited

U.S. PATENT DOCUMENTS

| | | | | |
|---|---|---|---|---|
| 5,675,807 A | * | 10/1997 | Iswandhi et al. | ........... 710/260 |
| 5,787,298 A | * | 7/1998 | Broedner et al. | ............ 713/323 |
| 5,991,831 A | | 11/1999 | Lee et al. | ...................... 710/33 |
| 6,006,286 A | | 12/1999 | Baker et al. | ................... 710/22 |
| 6,055,372 A | * | 4/2000 | Kardach et al. | ............ 710/261 |
| 6,061,411 A | | 5/2000 | Wooten | ...................... 375/372 |
| 6,064,566 A | | 5/2000 | Agata et al. | ................. 361/684 |
| 6,219,697 B1 | | 4/2001 | Lawande et al. | ........... 709/221 |
| 6,219,736 B1 | * | 4/2001 | Klingman | ................... 710/315 |
| 6,249,427 B1 | | 6/2001 | Carroll | ........................ 361/683 |
| 6,356,968 B1 | | 3/2002 | Kishon | ........................ 710/129 |

* cited by examiner

*Primary Examiner*—Jeffrey Gaffin
*Assistant Examiner*—Harold Kim
(74) *Attorney, Agent, or Firm*—Kaye Scholer LLP

(57) ABSTRACT

A wearable computer system includes a processing unit (102) and a number of peripherals. The processing unit and peripherals are coupled in a daisy-chain fashion utilizing a serial bus (120). The processing unit has a single connector for implementing the serial bus, and peripherals each have two connectors for propagating the serial bus. The wearable computer system has only one unused connector at any one time, thereby reducing excess bulk and weight due to excessive unused connectors. When a peripheral interrupts the processing unit, the processing unit relinquishes the serial bus to the interrupting peripheral. Alternatively, peripherals are assigned time slots within which the peripherals can utilize the serial bus.

17 Claims, 3 Drawing Sheets

METHOD AND APPARATUS FOR A WEARABLE COMPUTER

CROSS REFERENCE TO RELATED APPLICATIONS

This application is a division of and claims priority from U.S. patent application Ser. No. 09/390,785 filed on Sep. 7, 1999, now U.S. Pat. No. 6,725,282.

FIELD OF THE INVENTION

The present invention relates generally to computer systems and, in particular, to wearable computer systems.

BACKGROUND OF THE INVENTION

As computers decrease in size, new applications for smaller computers become possible. "Wearable" computers are one such application. Wearable computers are computers that can be worn by a human to perform a variety of tasks: Many different applications for wearable computers exist, each differing slightly.

Some applications for wearable computers, such as military applications wherein soldiers wear computers on the battlefield, are particularly demanding. Soldiers are required to carry an increasing amount of equipment as the battlefield becomes more electronic its is essential that the size and weight of computer carried by soldier is kept down to maintain his mobility.

A common approach to developing wearable computers is to house an fin industry standard personal computer (PC) such that it can be worn on a person's body. One drawback to using industry standard PCs for wearable computers arises from the number of connections typically employed between peripherals and computers. When an industry standard PC is the basis for a wearable computer, multiple peripheral connectors are typically left open for expansion. For example, a single disk drive may exist in a PC system having connectors for multiple disk drives, and parallel ports or serial ports may be left unused. This can result in unnecessary bulk and weight in the form of unused connectors and cables.

In military applications, where connectors are generally made more robust to handle harsh environments, the problems of extra bulk and weight become more acute. What are needed are an alternate method and apparatus for providing a wearable computer.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DETAILED DESCRIPTION OF THE DRAWINGS

In the following detailed description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

The method and apparatus of the present invention provide a lightweight expandable computer architecture without the extra bulk and weight associated with unused connectors and cables. The wearable computer has a processing unit and a number of peripherals interconnected with a single serial bus. Each peripheral preferably has two connectors such that peripherals can be daisy-chained, leaving a single connector unused at any one time. In one embodiment, when a peripheral requests service from the processing unit, the peripheral interrupts the processing unit and presents an identification word on a control bus. The processing unit has driver software that services the interrupt and communicates with the interrupting peripheral. In another embodiment, the serial bus is time-shared. Each peripheral is assigned a time slot in which the peripheral can communicate. During an assigned time slot, a peripheral can communicate with the processing unit, one or more other peripherals, or both.

Figure 1:
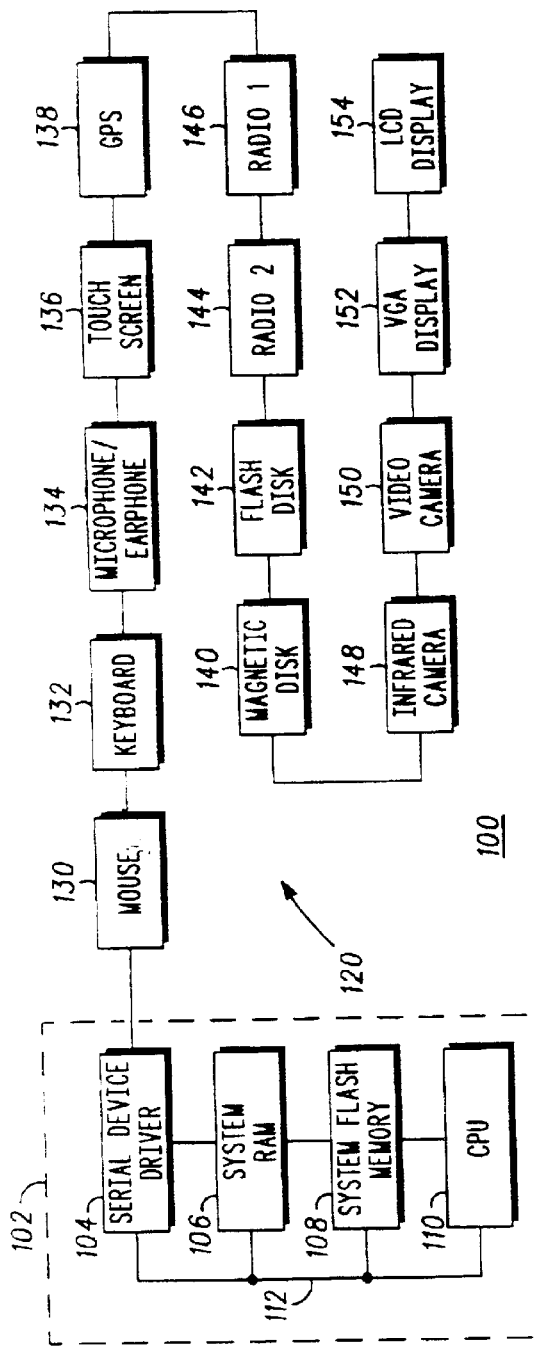
FIG. 1 shows a wearable computer system in accordance with a preferred embodiment of the present invention.

Turning now to the drawings, in which like reference characters indicate corresponding elements throughout the several views, attention is first directed to FIG. 1. FIG. 1 shows a wearable computer system in accordance with a preferred embodiment of the present invention. Wearable computer system 100 includes processing system 102 which is coupled to a number of peripheral devices via serial bus 120. Processing unit 102 includes serial device driver 104, system RAM 106, system flash memory 108, and central processing unit (CPU) 110, all coupled by bus 112. In alternate embodiments, wearable computer system 100 includes multiples of processing units, CPUs, and other components.

CPU 110 includes a microprocessor, digital signal processor, or the like. CPU 110 executes instructions stored in system RAM 106 and system flash memory 108. Serial device driver 104 is preferably a device driver utilizing a well-defined device driver interface available in modern operating systems such as Unix and Windows NT. Serial device driver 104 preferably includes a single hardware interrupt service routine that services interrupts from all of the peripherals on serial bus 120.

Processing unit 102 is coupled to peripherals using serial bus 120. Peripherals include mouse 130, keyboard 132, microphone/earphone 134, touch screen 136, and global positioning system (GPS) 138. Peripherals also include radio one 146, radio two 144, flash disk 142, magnetic disk 140, infrared camera 148, video camera 150, video graphics adapter (VGA) display 152, and liquid crystal display (LCD) display 154. The peripherals shown in FIG. 1 are exemplary, and other types of peripherals can be coupled to processing unit 102 while practicing the present invention.

Processing unit 102 preferably has a single serial connector for connecting peripherals to serial bus 120. Each peripheral connected to serial bus 120 preferably has two connectors. When a peripheral is connected to processing unit 102 on serial bus 120, one of the connectors on the peripheral is connected to the open connector on processing unit 102. The other connector on the peripheral becomes the open connector. Multiple peripherals are added in this manner resulting in a daisy-chain of peripherals on serial bus 120. This is described in more detail with reference to FIG. 2 below.

Serial bus 120 is preferably a medium speed serial communication link that supports peripherals having low data rates and low duty cycles. For example, mouse 130 and keyboard 132 generally produce very low data rates, and serial bus 120, when servicing mouse 130 and keyboard 132, operates at a data rate sufficient for support of the peripherals, but not so high as to waste power.

Serial bus 120 preferably includes a serial data channel, an interrupt line, and a control bus. The structure of serial bus 120 is described in further detail with reference to FIG. 3 below. The architecture of wearable computer system 100 allows peripherals to communicate with processing unit 102, or request control of serial bus 120 so that they can communicate with other peripherals. For example, any of the peripheral devices can assert the interrupt line to processing unit 102 and request control of serial bus 120. Interrupts to processing unit 102 are preferably processed by a single interrupt service routine handled by serial device driver 104. When a peripheral device gains control of serial bus 120, the peripheral device can send data to processing unit 102 or to any other peripheral on serial bus 120.

Each peripheral on serial bus 120 can communicate with processing unit 102 and a known set of peripherals on serial bus 120. Each peripheral gains knowledge of the peripherals with which it can communicate when processing unit 102 distributes a route map. Route maps are preferably generated when processing unit 102 has power applied, or when a peripheral is added.

Upon power up, or when a peripheral is added, processing unit 102 determines the number and type of peripherals connected. Processing unit 102 generates a route map based on the capabilities and functionality of the different peripherals. The route map specifies which peripherals can receive data when a specific peripheral takes control of the bus. For example, a peripheral such as a microphone can send data to many possible peripherals, including a radio, a memory, a processing unit, or other peripheral that stores or otherwise uses data from a microphone. After processing unit 102 generates the route map, the route map is distributed to the peripherals so that each peripheral has information regarding valid routes for data.

Table 1 shows an exemplary route map for four peripherals: a mouse, a keyboard, a radio, and a microphone/earphone. For each peripheral, a number of valid routes are described. For example, the mouse has three valid routes. The mouse can route cursor movements to the display controller, or it can send left or right button press information with cursor coordinates to the CPU. Also for example, radio one can send digitized audio to an earphone or to another radio, and it can send packet and command data to processing unit 102 and flash drive 142.

After processing unit distributes the route map, each peripheral includes the portion of the route map corresponding to valid routes for data originating from that peripheral. For example, the mouse has a route map that includes routes one through three under the heading "Mouse" in Table 1. Likewise, the keyboard has a route map that includes routes one through sixteen under the heading "Keyboard" in Table 1.

In operation, when a peripheral desires to send data, it asserts, an interrupt to processing unit 102. Processing unit 102 then relinquishes control of serial bus 120, and the peripheral can send data to any valid peripheral as identified by the route map. For example, if a computer user speaks into microphone/earphone 134 for the purpose of transmitting voice data from radio one 146, microphone/earphone 134 interrupts processing unit 102, and it then sends data packets on serial bus 120 to radio one 146.

Data packets sent by peripherals onto serial bus 120 include route information and data. Other peripherals listen to the serial bus, and when a packet includes route information intended for one of the other peripherals, it receives the data.

TABLE 1

Route Map

Mouse

| | |
|---|---|
| Route 1 | Cursor movements are sent to a display controller |
| Route 2 | Left button presses and cursor coordinates are sent to the CPU |
| Route 3 | Right button presses and cursor coordinates are sent to the CPU |

Keyboard

| | |
|---|---|
| Route 1 | Alphanumeric key presses are sent to the display controller |
| Route 2 | Alt-Enter-Del key presses are sent at a high priority to the CPU |
| Route 3 | Break key presses are sent at a high priority to the CPU |
| Route 4 | Enter key presses are sent to the display controller and the CPU |
| Route 5–16 | F1–F12 key presses are sent to the CPU |

Radio 1

| | |
|---|---|
| Route 1 | Digitized audio output is sent to the earphone |
| Route 2 | Digitized audio output is sent to Radio 2 for retransmission |
| Route 3 | Packet data is sent to the CPU |
| Route 4 | Packet data is sent to the CPU and the flash drive |
| Route 5 | Command data is sent to the CPU |

Microphone/Earphone

| | |
|---|---|
| Route 1 | Digitized audio using algorithm A is sent to Radio 1 |
| Route 2 | Digitized audio using algorithm B is sent to the CPU for speech recognition |
| Route 3 | Digitized audio using algorithm B is sent to the flash drive and to the CPU for speech recognition. |

The embodiment of FIG. 1 includes a single serial bus 120 interconnecting all peripherals and processing unit 102. Because communication with a display device such as VGA display 152 can utilize a great deal of bandwidth, in a preferred embodiment only a portion of the display is updated at any one time. This reduces the data rate so that the display can be effectively updated while sharing serial bus 120 with other peripherals. In another embodiment, multiple serial buses are used. For example, higher bandwidth devices such as VGA display 152 and video camera 150 can be interconnected on a separate serial bus with a slightly higher data rate. This alternate embodiment can be advantageous in part because slower devices can still operate on a slower serial bus, thereby saving power.

Figure 2:
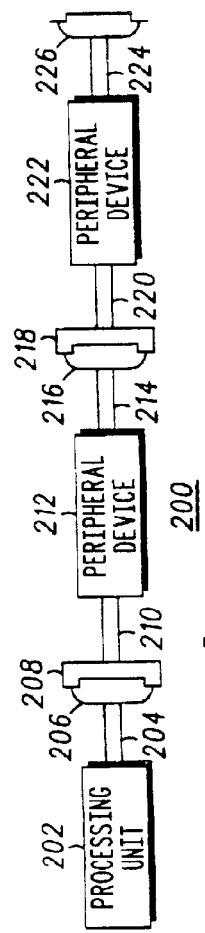
FIG. 2 shows interconnected peripherals in accordance with a preferred embodiment of the present invention.

FIG. 2 shows interconnected peripherals in accordance with a preferred embodiment of the present invention. Computer system 200 includes processing unit 202 interconnected with peripheral devices 212 and 222. Processing unit 202 is coupled to connector 206 with cable 204. Cable 204 preferably includes a serial bus such as serial bus 120 (FIG. 1). Connector 206 accepts cable 204 and presents the serial bus so that a mating connector may receive it.

Peripheral device 212 can be any peripheral device capable of operating on a serial bus such as serial bus 120 (FIG. 1). For example, peripheral device 212 can be any peripheral device shown in FIG. 1, or any other peripheral device suitable for connection to processing unit 202. Peripheral device 212 is coupled to connector 208 via cable 210. Connector 208 is adapted to mate with connector 206, thereby accepting signals from cable 204 onto cable 210. Peripheral device 212 is also coupled to connector 216 via cable 214.

Peripheral device 222, like peripheral device 212, is coupled to two connectors with cables. Peripheral device 222 is coupled to connector 218 with cable 220, and it is also coupled to connector 226 with cable 224. Peripheral device 222, like peripheral device 212, represents any of the peripheral devices shown in FIG. 1, or any other peripheral suitable for connecting to processing unit 202.

As shown in FIG. 2, computer system 200 includes a processing unit and multiple peripheral devices coupled to the processing unit in a daisy-chain fashion such that efficient use of connectors and cables is made. For example, when processing unit 202 exists alone without peripheral devices connected thereto, computer system 200 includes processing unit 202, cable 204, and connector 206. In this embodiment, connector 206 is the sole unused connector, and cable 204 is the sole cable in support of unused connectors. When a single peripheral device (peripheral device 212) is coupled to processing unit 202, the sole open connector (connector 206) is mated to a mating connector (connector 208), and connector 216 becomes the sole open connector. As additional peripheral devices such as peripheral device 222 are added in daisy-chain fashion, computer system 200 continues to have a single unused connector and a single cable in support of unused connectors.

The daisy-chain structure of computer system 200 is advantageous in part because a single unused connector and a single unused cable in support of unused connectors exist at any one time regardless of the number of peripheral devices connected to the processing unit. When a small number of peripheral devices exist, there is not a large number of unused connectors contributing to unnecessary bulk and weight.

Figure 3:
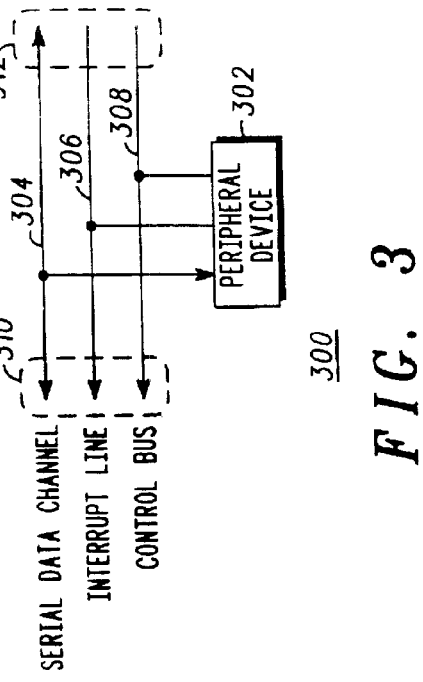
FIG. 3 shows a computer peripheral in accordance with a preferred embodiment of the present invention; Note! A single physical channel can be logically segmented for control/data/interrupt.

FIG. 3 shows a computer peripheral in accordance with a preferred embodiment of the present invention. Computer peripheral 300 includes peripheral device 302, connector 310, and connector 312. Connector 310 accepts cabling including serial data channel 304, interrupt line 308, and control bus 308. Connector 312 also accepts the same signals. Peripheral device 302 is coupled to serial data channel 304, interrupt line 306, and control bus 308. Peripheral device 302 can be any peripheral device suitable for interconnection with a processing unit. For example, peripheral device 302 can be peripheral device 212 (FIG. 2). When peripheral device 302 is peripheral device 212, connector 310 can be connector 208, and connector 312 can be connector 216.

Serial data channel 304 can include a single wire or multiple wires. Alternatively, other single or multi-path channel can be used such as fiber optic cable. Multiple wires can be advantageous for the purpose of hand-shaking and status. Interrupt line 306 can include any number of wires, but preferably includes a single wire so that a single interrupt is presented to the processing unit. The processing unit can then handle all interrupts with a single interrupt service routine. Control bus 308 includes a number of wires sufficient to uniquely identify each peripheral coupled thereto. Each peripheral device is assigned an identification (ID) word to be presented on control bus 308 when interrupting the processing unit. Control bus 308 also advantageously includes other control lines, such as status lines from a processing unit that enable connected peripheral devices to ascertain the status of the processor.

When peripheral device 302 needs service from a processing unit, peripheral device 302 asserts a signal on interrupt line 306. Peripheral device 302 also asserts an ID word onto control bus 308. The processing unit services the interrupt asserted on interrupt line 306, reads the ID word on control bus 308, and relinquishes control of serial data channel 304 to peripheral device 302. After peripheral device 302 has control of serial data channel 304, peripheral device 302 can send packets to a processing unit or to other peripherals listed in a route map maintained within peripheral device 302.

Computer peripheral 300 is advantageous in part because peripheral device 302 can be coupled to a computer system in a daisy-chain fashion, thereby allowing additional peripherals to be connected to the computer system while maintaining a single open connector. Also, computer peripheral 300 is advantageous in part because peripheral device 302 shares serial bus 304 with other peripherals, thereby saving system power.

Wearable computer systems have been described thus far as computer systems having peripherals that interrupt a processing unit for control of a serial bus. In an alternate embodiment, each peripheral is assigned a time slot within which to broadcast packets on the serial bus. This allows peripherals to communicate with a processing unit or with other peripherals without asserting an interrupt.

Figure 4:
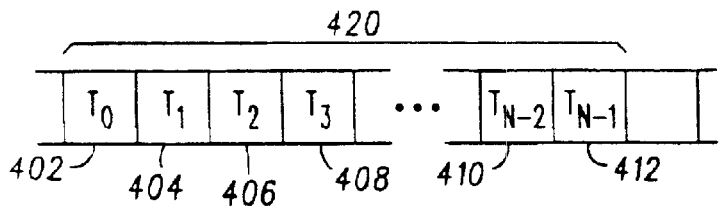
FIG. 4 shows time slots in accordance with an alternate embodiment of the present invention.

FIG. 4 shows time slots in accordance with an alternate embodiment of the present invention. In the embodiment of FIG. 4, time period 420 is divided into multiple time slots. Time period 420 is shown divided into time slots represented as time slots 402, 404, 406, 408, 410, and 412. The number of time slots can be equal to the number of peripherals, and it can also be equal to a number greater than the number of peripherals. When the number of time slots is equal to the number of peripherals, each peripheral is assigned a separate time slot within which to operate. To increase available bandwidth for peripherals having higher data rates, time period 420 can be divided into a number of time slots greater than the number of peripherals, and peripherals with higher data rates can be assigned multiple time slots. For example, keyboard 132 (FIG. 1) is generally assigned a single time slot because of the low data rate associated with keyboard use. Video camera 150 (FIG. 1) can be assigned multiple time slots to accommodate the higher data rate normally associated with video cameras.

When one peripheral is communicating during its time slot, the processing unit and other peripherals can monitor the serial bus. For example, the keyboard can send information on the serial bus during its time slot, and that information can be accepted by peripherals monitoring the serial bus, such as the processing unit and display device.

Figure 5:
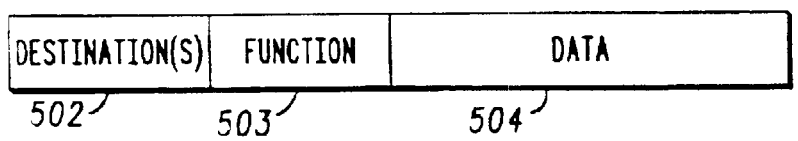
FIG. 5 shows a packet in accordance with an alternate embodiment of the present invention.

FIG. 5 shows a packet in accordance with an alternate embodiment of the present invention. Each peripheral, during its assigned time slot, broadcasts packets of information on a serial bus such as serial data channel 304 (FIG. 3) or serial bus 120 (FIG. 1). Packet 500 includes destination field 502 and data field 504. Destination field 502 generally includes route information from a route map provided to a peripheral from a processing unit. Destination field 502 can include route information that routes packet 500 to multiple destinations. Data field 504 includes data being sent to the destination specified in destination field 502.

The alternate embodiment described with reference to FIGS. 4 and 5 is advantageous in part because different amounts of bandwidth can be allocated to different peripherals simply by different numbers of time slots to different peripherals. The alternate embodiment of FIGS. 4 and 5 is not mutually exclusive with the embodiments discussed previously. For example, the use of interrupt line 306 (FIG. 3) can advantageously be combined with the implementation of time slots, thereby creating a priority scheme, wherein a peripheral device interrupting a processor can take priority over a peripheral operating within its assigned time slot. This invention also consider that both method could co-exist in the same system. Whereas (FIG. 3) could be used in a low power standby state and (FIG. 5) could be used during alert mode to provide maximum system performance with fair access.

Figure 6:
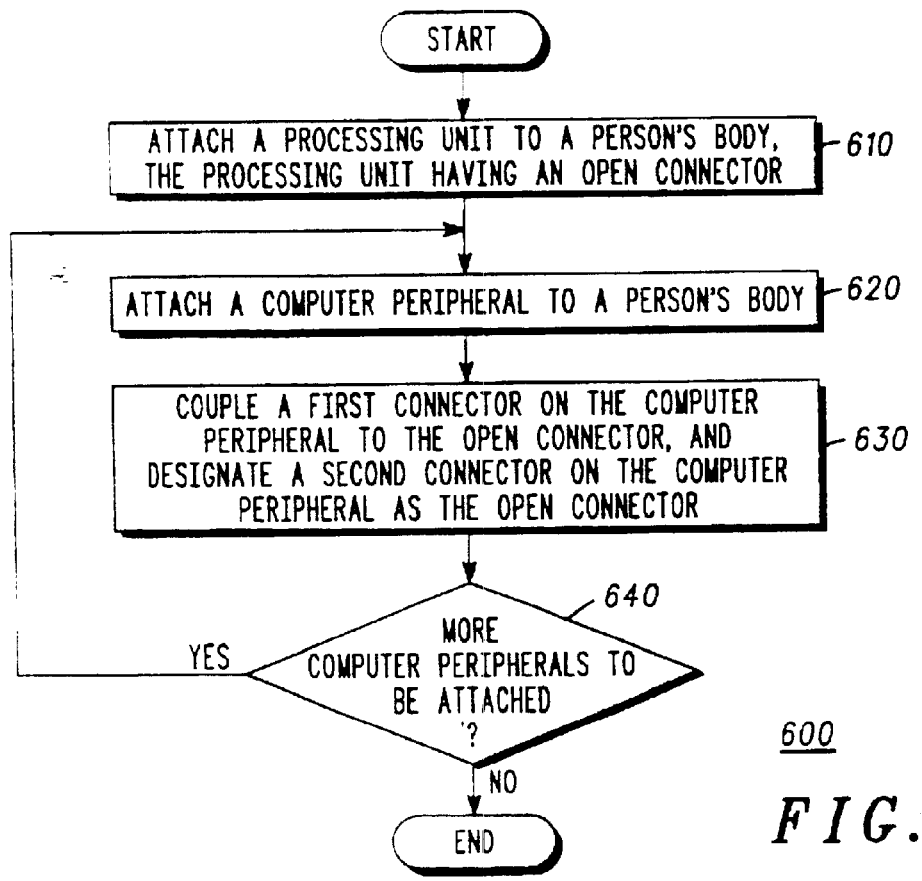
FIG. 6 is a flowchart of a method for coupling computer peripherals to a processing unit in accordance with a preferred embodiment of the present invention.

FIG. 6 is a flowchart of a method for coupling computer peripherals to a processing unit in accordance with a preferred embodiment of the present invention. Method 600 begins in step 610 when a processing unit having an open connector is attached to a person's body. The processing unit of step 610 can be a processing unit such as processing unit 102 (FIG. 1), or processing unit 202 (FIG. 2). In step 620, a computer peripheral is attached to the person's body. In step 630, a first connector on the computer peripheral is coupled to the open connector. When the first peripheral is coupled, the open connector being utilized is the open connector on the processing unit of step 610. A second connector on the computer peripheral is then designated as the open connector.

In decision block 640, a determination is made whether more computer peripherals are to be attached. If no more computer peripherals are to be attached, method 600 ends. If more computer peripherals are to be attached, method 600 continues with step 620. In step 620, the computer peripheral to be attached is attached to the person's body. In step 630, a first connector on the computer peripheral is coupled to the open connector, which is now a connector on a previously coupled computer peripheral. A second connector on the computer peripheral is then designated as the open connector. Method 600 again passes through decision block 640 where a determination is made if more computer peripherals are to be attached. The loop including steps 620 and 630, and decision block 640 is traversed for each subsequent peripheral to be attached to the processing unit.

Method 600 can be advantageously applied to computer systems such as wearable computer system 100, and computer system 200. Any number of computer peripherals can be coupled to a processing unit utilizing method 600 without leaving more than one unused connector. This reduces the bulk and weight associated with unused cables and connectors.

Figure 7:
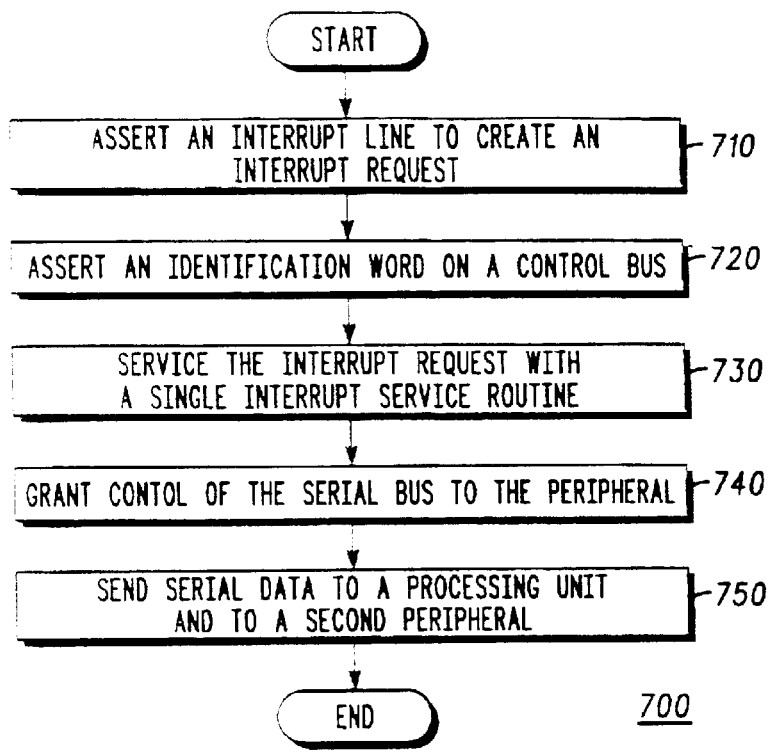
FIG. 7 is a flowchart of a method for providing communications on a serial bus in accordance with a preferred embodiment of the present invention.

FIG. 7 is a flowchart of a method for providing communications on a serial bus in accordance with a preferred embodiment of the present invention. Method 700 begins with step 710 when an interrupt line is asserted to create an interrupt request. In step 720, an ID word is asserted onto a control bus. The ID word asserted onto the control bus identifies a peripheral that asserted an interrupt in step 710.

In step 730, the interrupt request is serviced with a single interrupt service routine. The single interrupt service routine is preferably included within a serial device driver such as serial device driver 104 (FIG. 1). In step 740, control of a serial bus is granted to the peripheral creating the interrupt request. In step 750, the peripheral with control of the serial bus sends serial data to a processing unit and to a second peripheral. One skilled in the art will understand that in step 750, the peripheral with control of the serial bus can send data to either of a processing unit or a second peripheral without departing from the scope of the present invention.

Method 700 can be advantageously utilized in a wearable computer system such as wearable computer system 100 (FIG. 1) in part because one of many peripherals can be in control of a serial bus such as serial bus 120, and it can communicate with other peripherals and a processing unit. For example, referring now to FIG. 1, keyboard 132 can gain control of serial bus 120 utilizing method 700 and advantageously send data simultaneously to processing unit 102 and VGA display 152. Once a peripheral has gained control of the serial bus, it is able to send data to other devices without routing the data through processing unit 102. This allows peripherals to communicate directly to other peripherals while processing unit 102 can handle other tasks. Method 700 advantageously saves system power by allowing slower peripherals to communicate without causing processing unit 102 to consume power transferring data.

Figure 8:
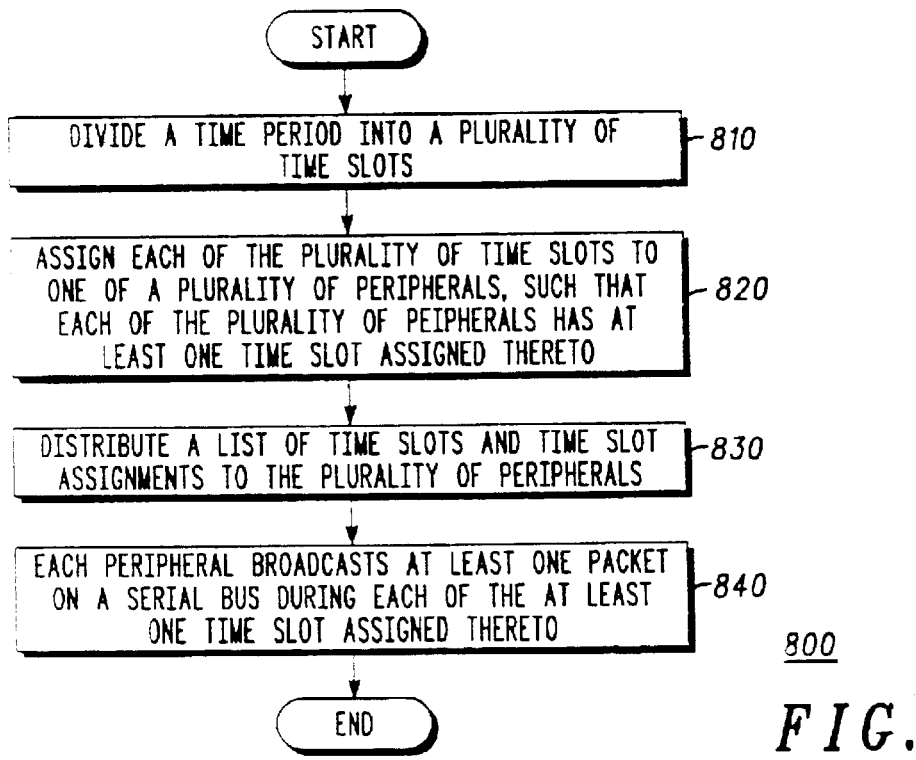
FIG. 8 is a flowchart of a method for providing communications on a serial bus in accordance with an alternate embodiment of the present invention.

FIG. 8 is a flowchart of a method for providing communications on a serial bus in accordance with an alternate embodiment of the present invention. Method 800 begins in step 810 when a time period is divided into a plurality of time slots. The time slots resulting from step 810 can be time slots resulting from the division of time period 420 as shown in FIG. 4. In step 820, each of the time slots is assigned to a peripheral such that each of the peripherals has at least one time slot assigned thereto.

In step 830, a list of time slots and time slot assignments is distributed to the peripherals. Step 830 can be performed at any time, but is preferably performed as part of a power up initialization sequence, or whenever a peripheral is added to a computer system.

In step 840, each peripheral broadcasts at least one packet on the serial bus during each of the time slots assigned thereto. If a peripheral is assigned multiple time slots, then that peripheral has access to greater bandwidth than peripherals assigned fewer time slots. This can be advantageous when supporting peripherals that benefit from greater bandwidth, such as video camera 150 (FIG. 1) or magnetic disk 140 (FIG. 1).

In summary, the method and apparatus of the present invention provides a computer system having peripherals interconnected with a serial bus. While we have shown and described specific embodiments of the present invention, further modifications and improvements will occur to those skilled in the art. For example, while the method and apparatus of the present invention have been described with reference to a military application for a wearable computer, the method and apparatus of the present invention also apply to any application for a lightweight computer having daisy-chained peripherals. For example, the method and apparatus of the present invention can be advantageously utilized in smart munitions and missile systems, and computer systems used for transportation, medical, home, business, educational and personal entertainment applications. We desire it to be understood, therefore, that this invention is not limited to the particular forms shown and we intend in the appended claims to cover all modifications that do not depart from the spirit and scope of this invention.

What is claimed is:

1. In a wearable computer system having a processing unit and a plurality of peripherals interconnected by a serial data channel, a control bus, and multiple interrupt lines, a method of communicating on the serial data channel, the method comprising:

a first of the plurality of peripherals asserting an interrupt line of at least one of the multiple interrupt lines to create an interrupt request;

the first of the plurality of peripherals asserting an identification word on the control bus, wherein the control bus further comprises a plurality of control lines configured to uniquely identify each peripheral of the plurality of peripherals; and the processing unit servicing the interrupt request and granting control of the serial data channel to the first of the plurality of peripherals.

2. The method of claim 1 wherein the processing unit includes a single interrupt service routine that services the plurality of peripherals.

3. The method of claim 1 wherein any one of the plurality of peripherals is capable of acting as the first of the plurality of peripherals.

4. The method of claim 1 wherein the first of the plurality of peripherals is granted control of the serial data channel, the first of the plurality of peripherals sends serial data to a second of the plurality of peripherals.

5. The method of claim 4, wherein the first of the plurality of peripherals chooses the second of the plurality of peripherals using a route map distributed by the processing unit.

6. An apparatus for communicating data over a serial data channel in a wearable computer system having a processing unit and a plurality of peripherals interconnected by the serial data channel, said apparatus comprising:

means for asserting an interrupt line of at least one of multiple interrupt lines to create an interrupt request by a first of a plurality of peripherals;

means for asserting an identification word on the control bus by the first of the plurality of peripherals, wherein the control bus further comprises a plurality of control lines configured to uniquely identify each peripheral of the plurality of peripherals; and means for servicing the interrupt request and granting control of the serial data channel to the first of the plurality of peripherals.

7. The apparatus of claim 6 wherein the processing unit includes a single interrupt service routine that services the plurality of peripherals.

8. The apparatus of claim 6 wherein any one of the plurality of peripherals is capable of acting as the first of the plurality of peripherals.

9. The apparatus of claim 6 wherein the first of the plurality of peripherals is granted control of the serial data channel, the first of the plurality of peripherals sends serial data to a second of the plurality of peripherals.

10. The apparatus of claim 9, wherein the first of the plurality of peripherals chooses the second of the plurality of peripherals using a route map distributed by the processing unit.

11. A system for communicating data in a wearable computer system, said system comprising:

a serial data channel;

multiple interrupt lines;

a control bus comprising a plurality of control lines configured to uniquely identify each peripheral of the plurality of peripherals;

a processing unit; and a plurality of peripherals interconnected by the serial data channel, the interrupt line and the control bus to the processing unit, wherein a selected peripheral is configured to assert an interrupt line of at least one of the multiple interrupt lines to create an interrupt request to the processing unit and to assert an identification word on the control bus to the processing unit and the processing unit is configured to service said interrupt request and grant control of the serial data channel to the selected peripheral based on the identification word.

12. The system of claim 11 wherein the processing unit includes a single interrupt service routine that services the plurality of peripherals.

13. The system of claim 11 wherein any one of the plurality of peripherals is capable of acting as the selected peripheral.

14. The system of claim 11 wherein the selected peripheral is granted control of the serial data channel, the selected peripheral sends serial data to a second of the plurality of peripherals.

15. The system according to claim 11, wherein the processing unit is configured to generate a route map for the plurality of peripherals.

16. The system according to claim 15, wherein the processing unit configured to distribute portions of the route map to respective peripherals of the plurality of peripherals.

17. The apparatus of claim 16, wherein the selected peripheral chooses a second of the plurality of peripherals using the route map.

* * * * *

UNITED STATES PATENT AND TRADEMARK OFFICE
CERTIFICATE OF CORRECTION

PATENT NO. : 7,133,952 B2
APPLICATION NO. : 10/178158
DATED : November 7, 2006
INVENTOR(S) : Peter W. Grzybowski, Charlene J. Todd and Russell W. Adams It is certified that error appears in the above-identified patent and that said Letters Patent is hereby corrected as shown below:

Title Page item 73
Assignee: Bath Iron Works Corporation (Bath, ME)

Signed and Sealed this

Twenty-fifth Day of December, 2007

JON W. DUDAS
*Director of the United States Patent and Trademark Office*